UNITED STATES PATENT OFFICE.

ALEXANDER T. MOORE, OF NEW ORLEANS, LOUISIANA.

METHOD OF TREATING FABRICS.

1,019,909.  Specification of Letters Patent.  Patented Mar. 12, 1912.

No Drawing.  Application filed December 13, 1909. Serial No. 532,918.

*To all whom it may concern:*

Be it known that I, ALEXANDER T. MOORE, citizen of the United States, residing at New Orleans, parish of Orleans, State of Louisiana, have invented certain new and useful Improvements in Methods of Treating Fabrics, of which the following is a specification.

This invention relates to a method of treating fabrics to render the same both insect and moisture proof so that it is particularly adapted for use in forming bags for grain, sugar and other perishable goods.

The invention has for an object to render fabric and other material impervious to the attacks of insects or rodents and also waterproof by saturating it in a solution of salt and water, after which it is dried, and subsequently immersed in a bath of heated paraffin and then finally dried.

Other and further objects and advantages of the invention will be hereinafter set forth and the novel features thereof set forth in the appended claim.

The method consists in first saturating the fabric or other material in a salt solution, preferably formed from 50 pounds of salt or sodium chlorid to 5 gallons of water. After saturation the excess moisture is removed by wringing and it is thoroughly dried. The fabric is then immersed in a bath of heated paraffin and afterward dried. The salt coating upon the fibers of the fabric forms a preventive against attacks of insects or rodents to which it is repulsive and also prevents decay of the fibers. The coating of paraffin closes the meshes of the fabric to prevent the escape of fine material from a bag and also renders it proof against moisture and water. It also preserves and strengthens the material. This method thus produces a fabric for bags which is protected against insects and rodents and also rendered waterproof.

Having described my invention and set forth its merits what I claim and desire to secure by Letters Patent is:—

The method of treating fabrics consisting in saturating them with a saline solution composed of substantially five gallons of water and fifty pounds of sodium chlorid, removing the moisture from the fabric, and subsequently subjecting it to a bath of heated paraffin.

In testimony whereof I affix my signature in presence of two witnesses.

ALEXANDER T. MOORE.

Witnesses:
G. A. SCHMIDT, Jr.,
JACOB LANG, Sr.